(12) United States Patent
Gerhartz et al.

(10) Patent No.: US 7,202,578 B2
(45) Date of Patent: Apr. 10, 2007

(54) ELECTROMAGNETIC DRIVE DEVICE

(75) Inventors: Jürgen Gerhartz, Esslingen (DE); Reinhard Schwenzer, Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/541,230

(22) PCT Filed: May 13, 2004

(86) PCT No.: PCT/EP2004/005119

§ 371 (c)(1),
(2), (4) Date: Jun. 29, 2005

(87) PCT Pub. No.: WO2004/112063

PCT Pub. Date: Dec. 23, 2004

(65) Prior Publication Data

US 2006/0082227 A1    Apr. 20, 2006

(30) Foreign Application Priority Data

Jun. 14, 2003 (DE) ................................ 103 26 911

(51) Int. Cl.
*F01L 9/04* (2006.01)
*H01F 7/16* (2006.01)
*F16K 31/06* (2006.01)
(52) U.S. Cl. .............................. 310/23; 310/30; 310/34
(58) Field of Classification Search .................. 310/23, 310/30, 34; 335/220, 229, 234, 236
See application file for complete search history.

(56) References Cited

U.S. PATENT DOCUMENTS 4,346,318 A    8/1982   Shtrikman

| 4,371,857 A | 2/1983 | Bohg et al. |
| 4,555,216 A * | 11/1985 | Buschor ..................... 414/728 |
| 6,755,161 B2 * | 6/2004 | Grundl et al. ........... 123/90.11 |

FOREIGN PATENT DOCUMENTS

| DE | 30 18407 A1 | 11/1981 |
| DE | 44 0822 A1 | 7/1995 |
| DE | 199 00762 A1 | 7/2000 |
| JP | 2002130514 A * | 5/2002 |
| WO | WO 02/08579 A1 | 1/2002 |

* cited by examiner

*Primary Examiner*—Darren Schuberg
*Assistant Examiner*—David W. Scheuermann
(74) *Attorney, Agent, or Firm*—Hoffman & Baron, LLP

(57) ABSTRACT

An electromagnetic drive device comprises a drive part (10) arranged to be reciprocated in the stroke direction (H) and possessing a circular or oval cross section, said drive part having a permanent magnet arrangement magnetized athwart the stroke direction (H), such arrangement possessing at least one pair of oppositely magnetized magnet portions (11 through 14) arranged sequentially in the stroke direction and being arranged in the intermediate space of a yoke arrangement (16) with pole pieces (19 through 22) provided in the direction of magnetization on opposite sides of the drive part (10). The yoke arrangement (16) possesses two pairs of pole pieces (19 through 22) delimiting the intermediate space and which are joined together by two yoke regions (23 and 24) extending essentially in parallelism to the stroke direction (H). At least one of the yoke regions (23 and 24) is surrounded by a coil (25 and 26) able to conduct current for performing a stroke. Each pair of pole pieces (19 and 21 and respectively 22 and 22) is provided with a pair of oppositely magnetized magnet portions (11, 12; 32, 33 and, respectively, 13, 14; 34, 35) of the permanent magnet arrangement. This means that it is simple to design for an extremely narrow overall size.

10 Claims, 4 Drawing Sheets

ELECTROMAGNETIC DRIVE DEVICE

FIELD OF INVENTION

The invention relates to an electromagnetic drive device comprising a drive part arranged to be reciprocated in the stroke direction and possessing a circular or oval cross section, said drive part having a permanent magnet arrangement magnetized athwart the stroke direction, such arrangement possessing at least one pair of oppositely magnetized magnet portions arranged sequentially in the stroke direction and being arranged in the intermediate space of a yoke arrangement with pole pieces provided in the direction of magnetization on opposite sides of the drive part.

BACKGROUND OF THE INVENTION

Such an electromagnetic drive device as disclosed in the German patent publication DE 19,900,762 C2 possesses only two pole pieces arranged on opposite sides of the drive part, which are each surrounded in an annular manner by a coil, able to conduct current, so that the axial direction of the coils is the same as the magnetization direction of the magnet portions of the drive part. In the preferred design the drive part is flat and plate-like.

In the case of many applications, more especially for valves a particularly flat design of the overall electromagnetic drive device is important. Using the known arrangement a flat design is not able to be realized.

SUMMARY OF THE INVENTION

One object of the present invention is to create an electromagnetic drive device of the type initially mentioned, which may be particularly flat in design.

In accordance with the invention this object is achieved since the yoke arrangement possesses two pairs of pole pieces delimiting the intermediate space and which are joined together by two yoke regions extending essentially in parallelism to the stroke direction, at least one of the yoke regions being surrounded by a coil able to conduct current for performing a stroke and each pair of pole pieces is provided with a pair of oppositely magnetized magnet portions of the permanent magnet arrangement.

The advantages of the electromagnetic drive device of the invention are more especially that it may be produced with a simple design, which is extremely narrow and flat, the width of the overall arrangement hardly exceeding the diameter of the drive part and simultaneously essentially being equal to the width of the pole pieces. This drive device is therefore more particularly suitable for very narrow plate valves. A further advantage is that the drive device generously allows for inaccuracies in manufacture owing to the radially symmetrical design. No substantial twisting and tilting forces occur, which might impair the service life of the bearings.

In the current-less state of the at least one coil each pair of oppositely magnetized magnet portions is positioned in the vicinity of two pole pieces arranged on either side of the drive part, that is to say the arrangement is self-centering.

The pairs of magnet parts are preferably arranged spaced apart from one another by an intermediate piece in the stroke direction, the intermediate piece preferably being manufactured of non-magnetizable material, as for example plastic. This means that there is an enhanced magnetic action.

In the case of an advantageous design the drive part consists of a tube or round rod of non-magnetizable material, for example plastic, which bears the magnet portions. In this case each magnet portion comprises two oppositely magnetized semi-circular disks or half rings. The magnet portions are in this case preferably arranged in pits or recesses or in the tube or round rod. Accordingly the design may be realized in a particularly simple and economic manner.

The drive part may be connected with an output drive part, which preferably is designed in the form of a piston of a piston spool valve or some other valve member.

For the connection with the output drive the drive part designed in the form of a tube provided with the permanent magnet arrangement is preferably in the form of a gripper tongs, which is thus able to be connected with the drive output part.

In order to increase the stroke force it is possible for several yoke arrangements to the placed in tandem in the stroke direction.

Working examples of the invention are represented in the drawing and are described in the following account.

DETAILED DESCRIPTION OF THE PREFERRED EMBODIMENTS

Figure 1:
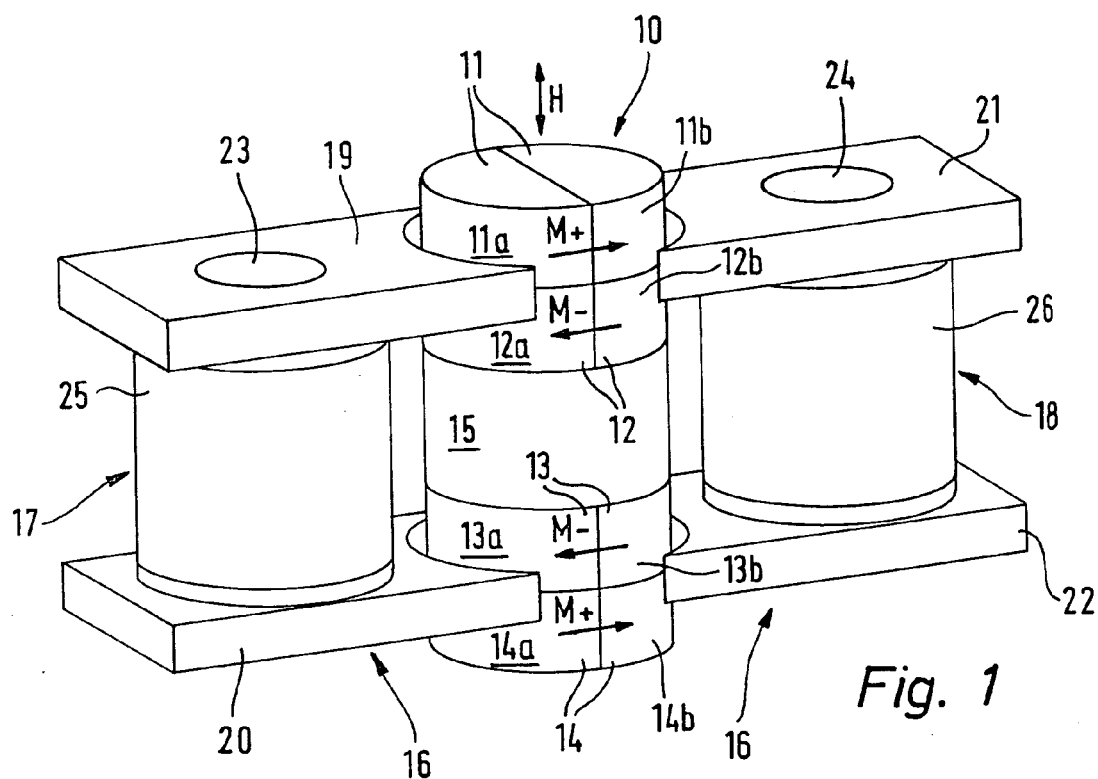
FIG. 1 is a perspective overall view of an electromagnetic drive device with two coils as an embodiment of the invention.

In the case of the first working embodiment represented in FIG. 1 a circularly cylindrical drive part 10 comprises four disk-like magnet portions 11 through 14 magnetized athwart the stroke direction H, the magnet portions 11 and 12 arranged in tandem in the stroke direction on the one hand and the magnet portions 13 and 14 on the other hand also arranged in tandem in the stroke direction being respectively oppositely magnetized, something which is indicated by magnetic field arrows M+ and M−. The contiguous magnet portions 11 and 12 are separated by a circularly cylindrical intermediate piece 15 from the also contiguous magnet portions 13 and 14, such intermediate piece 15 consisting of non-magnetizable material, for example plastic. However, it could comprise magnetizable material or, given suitable dimensions of the magnet portions 11 through 14, it could be omitted.

Figure 3:
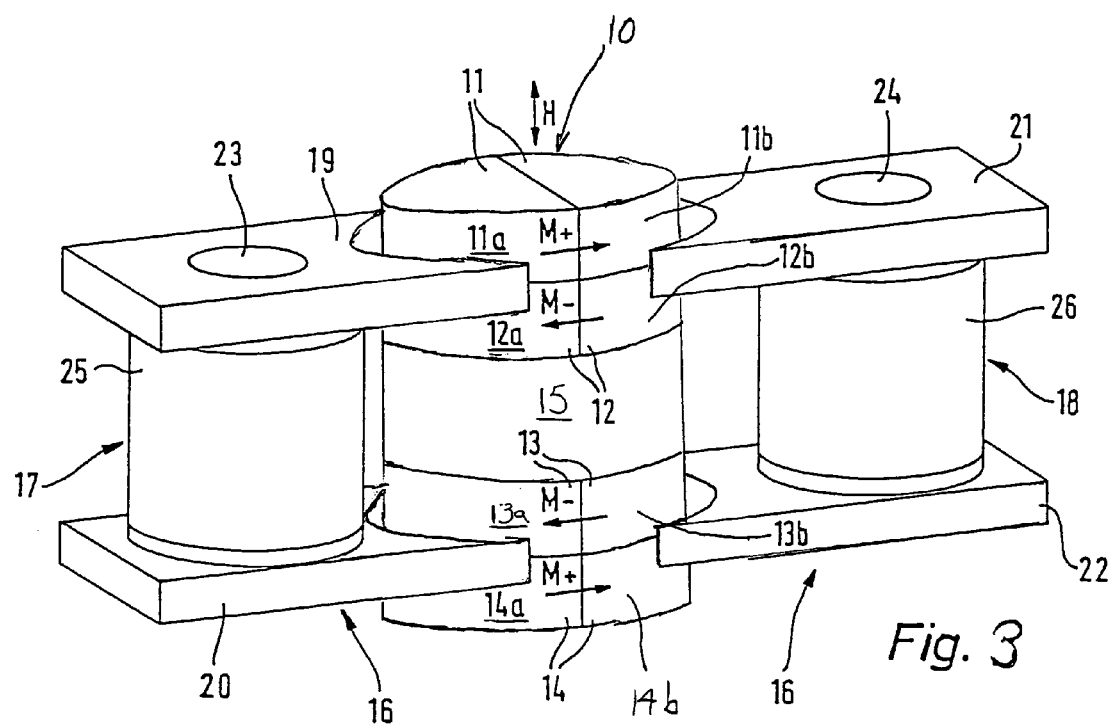
FIG. 3 is a perspective overall view of an electromagnetic drive device having a drive part with an oval cross-section.

The magnet portions 11 through 14 respectively comprise two half disks 11a through 14a and 11b through 14b in order to be able to more readily realize the desired magnetization direction. In principle diametrically magnetized solid disks or full rings or half rings could be employed. Instead of circular cross sections oval or elliptical cross sections are also possible, as shown in FIG. 3.

A yoke arrangement 16 comprises essentially U-like yoke parts 17 and 18, which are arranged on opposite sides of the drive part 10. In this case the limbs, constituting the two pole pieces 19 and 20, of the yoke part 17 and the two limbs, also constituting pole pieces 21 and 22, of the yoke part 18 are respectively arranged opposite each other so that the drive part 10 is arranged in the circular intermediate space between the pole pieces 19 and 20 on the one hand and the pole pieces 20 and 22 on the other hand with the formation of a gap. In this arrangement the width of the pole pieces 19 through 22 is essentially equal to the diameter of the drive part 10 so that the overall width of the drive device is essentially equal to the diameter of the drive part 10.

The distance apart of the pole pieces 19 through 21 and of the pole pieces 21 and 22 on the other hand in the stroke direction is such that the parting face between the magnet parts 11 and 12 is positioned in the plane of the pole pieces 19 and 21 and the parting face between the magnet poles 13 and 14 is positioned in the plane of the pole pieces 20 and 22. Such positioning may be achieved by varying the height of the magnet poles 11 through 14 and of the intermediate piece 15.

The pole pieces 19 and 20 are joined together in one yoke region 23 and the pole pieces 21 and 22 are joined together in one yoke region 24. Such yoke regions 23 and 24 constitute cores for two magnet coils 25 and 26, which annularly surround the yoke region 23 and 24. In principle it is also possible to arrange a magnet coil on only one of the yoke regions 23 and 24.

In the case of the described electromagnetic drive device the drive part 10 is magnetically centered, i. e. when the magnet coils 25 and 26 are not electrically excited, it is located in the illustrated symmetrical position. For deflection of the drive part 10 the magnet coils 25 and 26 are excited oppositely. Dependent on the current there is a larger or smaller deflection of the drive part in the pole piece to one side and in the case of opposite excitation to the other side. The maximum stroke in the one direction is reached when the magnet portions 11 and 13 are aligned with the pole pieces and in the other direction when the magnet portions 12 and 14 are aligned with the pole pieces. On turning off the current there is an automatic return to the centered initial position.

Figure 4:
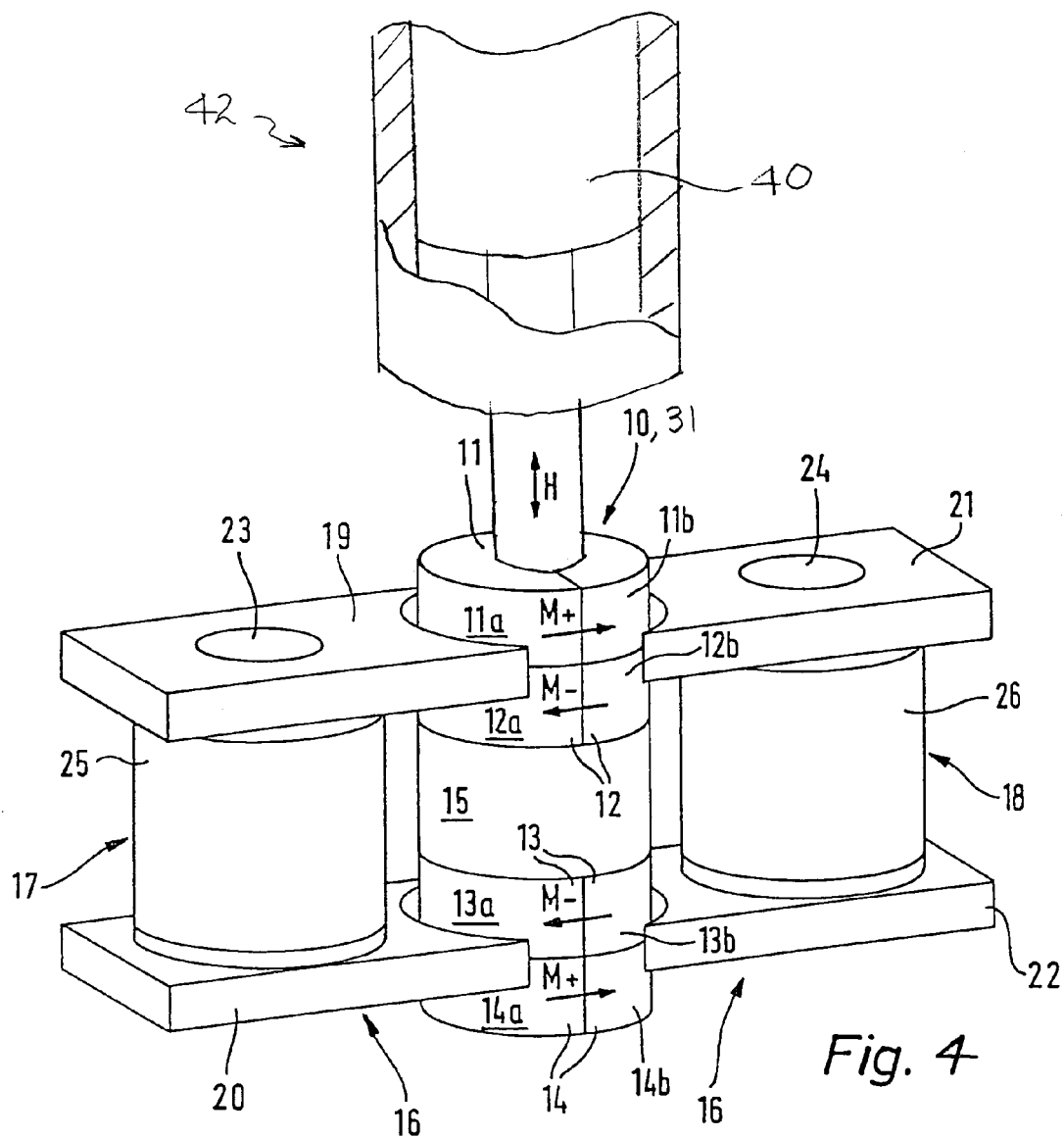
FIG. 4 is a perspective overall view of an electromagnetic drive device having a drive part connected with an output drive part which is designed in the form of a piston of a piston spool valve.

The above described electromagnetic drive device may for example be employed for the operation of the piston 40 of a piston spool valve 42 or other valve member, as is shown in FIG. 4 and described and illustrated in the initially mentioned prior art. On the other hand such electromagnetic drive device may also be employed as an electromagnetic operating device for all equipment, in the case of which a certain set stroke is to be performed.

Figure 2:
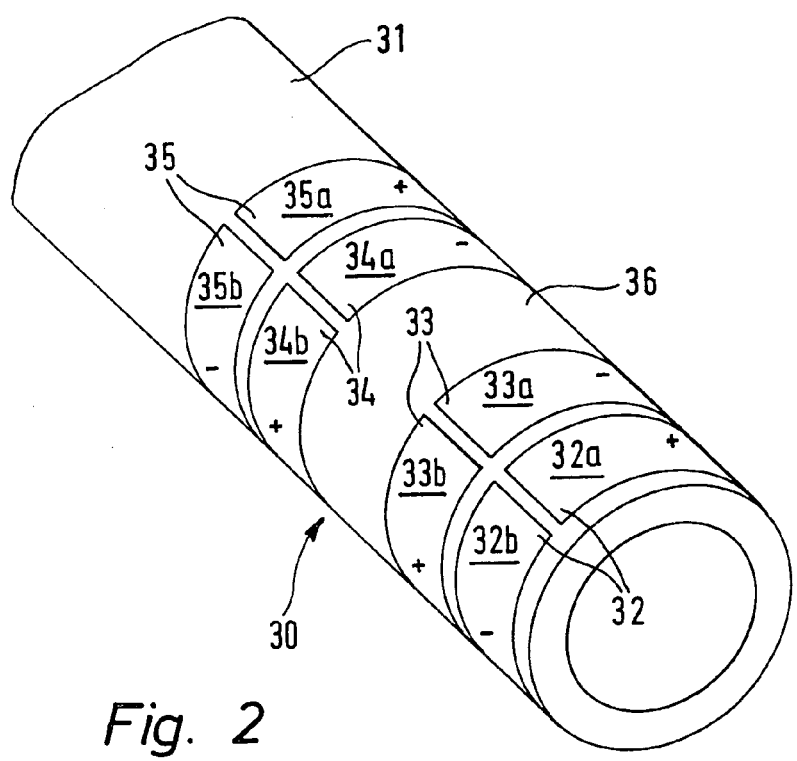
FIG. 2 is a perspective representation of a drive part having a plastic tube provided with magnet portions.

In FIG. 2 an alternative design of a drive 30 is illustrated. The drive part essentially comprises a plastic tube 31, which may consist of another, non-magnetizable material and may have a round or oval cross section. Instead of the magnet portions 11 through 14 there are here the magnet portions 32 through 35, which respectively comprise two oppositely magnetized half rings 32 through 35a and 32b through 35b. Same are arranged suitable pits in the plastic tube 31 and fixed therein. Departing for the illustrated design the magnet portions 32 and 33 on the one hand and the magnet portions 34 and 35 on the other hand may be in mutual contact. They are separated from each other by an spacing region 36 of the plastic tube 31, which corresponds to the intermediate piece in the first working embodiment in function. Furthermore the half rings respectively forming a magnet portion may engage each other without any clearance.

As a modification of the second working example it is also possible for instance for the half rings 32a and 32b to be integral in design, something which will then apply for the corresponding other half rings. Should no distance apart or clearance region 36 be provided, it is also possible for all half rings 32a through 35a to be manufactured integrally and all half rings 32 through 35b to be respectively integrally manufactured. Furthermore a design as half disks or diametrally magnetized solid disks is possible.

The plastic tube 31 can have its sectioned side connected with an output drive part, as for example valve spool, as shown in FIG. 4. For this purpose the plastic tube 31 may at least on this connection side by designed like a holding tongs in order in a simple manner to secure or releaseably hold the output drive part.

Figure 5:
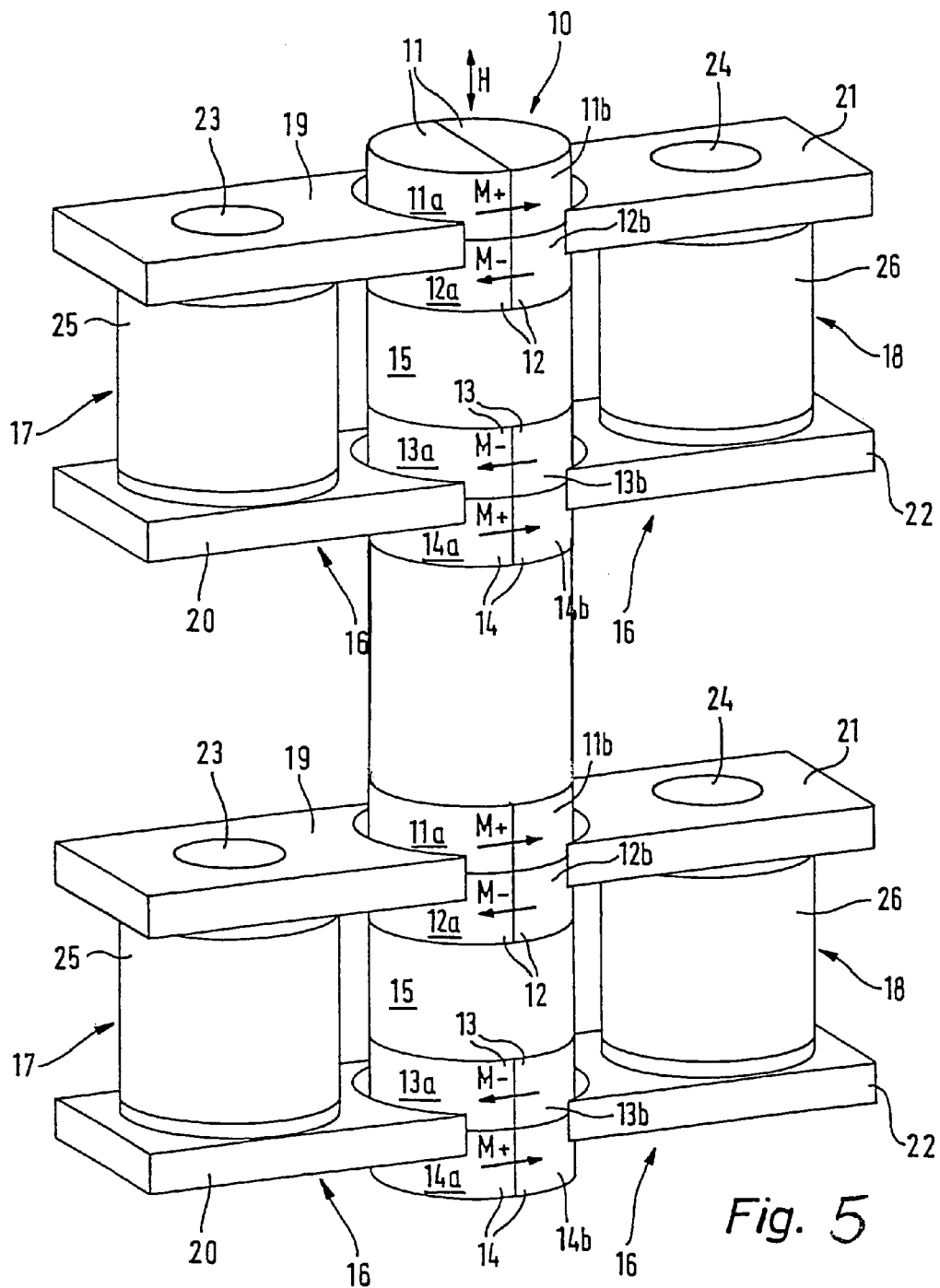
FIG. 5 is a perspective overall view of an electromagnetic drive device having two yoke arrangements arranged in tandem in the stroke direction.

In order to increase the stroke force several yoke arrangements 16 may be placed together in tandem, as shown in FIG. 5. In this case the arrangement is admittedly made longer, but however the narrow width may be adhered to. The drive part 10 could then obviously be provided with further pairs of magnet portions.

The invention claimed is:

1. An electromagnetic drive device comprising a drive part arranged to be reciprocated in a stroke direction and possessing a circular or oval cross section, said drive part having a permanent magnet arrangement magnetized athwart the stroke direction, such arrangement consisting essentially of two pairs of oppositely magnetized magnet portions arranged sequentially in the stroke direction and being arranged in the intermediate space of a yoke arrangement with pole pieces provided in the direction of magnetization on opposite sides of the drive part, wherein the yoke arrangement consists essentially of two pairs of pole pieces delimiting the intermediate space and which are joined together by two yoke regions extending essentially in parallelism to the stroke direction, at least one of the yoke regions being surrounded by a coil able to conduct current for performing a stroke and each pair of pole pieces is provided with a pair of oppositely magnetized magnet portions of the permanent magnet arrangements, and wherein each pair of magnet portions includes an inner magnet portion and an oppositely magnetized outer magnet portion, said inner magnet portions facing one another to form a common magnetic pole in a center portion of said drive part, and said outer magnet portions forming an opposite magnetic pole at each end portion of said drive part.

2. The electromagnetic drive device as set forth in claim 1, wherein in the non-energized state of the at least one coil each pair of oppositely magnetized magnet portions is positioned in the vicinity of two pole pieces arranged on either side of the drive part.

3. The electromagnetic drive device as set forth in claim 1, wherein the pairs of magnet portions are spaced apart by an intermediate piece in the stroke direction.

4. The electromagnetic drive device as set forth in claim 3, wherein the intermediate piece comprises non-magnetizable material.

5. The electromagnetic drive device as set forth in claim 1, wherein the width of the pole pieces and/or the diameter of the at least one coil is essentially equal to the diameter of the drive part.

6. The electromagnetic drive device as set forth in claim 1, wherein the drive part comprises a tube or round rod of non-magnetizable material, more especially plastic, which bears the magnet portions.

7. An electromagnetic drive device comprising a drive part arranged to be reciprocated in the stroke direction and possessing a circular or oval cross section, said drive part having a permanent magnet arrangement magnetized athwart the stroke direction, such arrangement possessing at least one pair of oppositely magnetized magnet portions arranged sequentially in the stroke direction and being arranged in the intermediate space of a yoke arrangement with pole pieces provided in the direction of magnetization on opposite sides of the drive part, wherein the yoke arrangement possesses two pairs of pole pieces delimiting the intermediate space and which are joined together by two yoke regions extending essentially in parallelism to the stroke direction, at least one of the yoke regions being surrounded by a coil able to conduct current for performing a stroke and each pair of pole pieces is provided with a pair of oppositely magnetized magnet portions of the permanent magnet arrangement, and wherein the drive part comprises a tube or round rod of non-magnetizable material, which bears the magnet portions, and wherein each magnet portion comprises two oppositely magnetized semi-circular disks or half rings.

8. The electromagnetic drive device as set forth in claim 7, wherein the magnet portions are arranged in pits or recesses in the tube or round rod.

9. The electromagnetic drive device as set forth in claim 1, wherein the drive part is connected with an output drive part which is designed in the form of a piston of a piston spool valve.

10. The electromagnetic drive device as set forth in claim 1, wherein several yoke arrangements are arranged in tandem in the stroke direction.

* * * * *